US007266373B2

(12) United States Patent
Aubauer et al.

(10) Patent No.: US 7,266,373 B2
(45) Date of Patent: Sep. 4, 2007

(54) METHOD AND TELECOMMUNICATION SYSTEM INVOLVING WIRELESS TELECOMMUNICATION BETWEEN A MOBILE PART AND A BASE STATION FOR REGISTERING A MOBILE PART

(75) Inventors: Roland Aubauer, München (DE); Erich Kamperschroer, Hamminkein (DE); Stefano Ambrosius Klinke, Kerpen (DE); Niels Kunstmann, Haar (DE); Karl-Heinz Pflaum, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 283 days.

(21) Appl. No.: 10/536,405

(22) PCT Filed: Sep. 17, 2004

(86) PCT No.: PCT/EP2004/052227

§ 371 (c)(1),
(2), (4) Date: May 25, 2005

(87) PCT Pub. No.: WO2005/029828

PCT Pub. Date: Mar. 31, 2005

(65) Prior Publication Data

US 2006/0148501 A1 Jul. 6, 2006

(30) Foreign Application Priority Data

Sep. 17, 2003 (DE) ................ 103 43 066

(51) Int. Cl.
*H04Q 7/20* (2006.01)
(52) U.S. Cl. ............... 455/435.1; 455/41.2; 455/74.1; 455/411; 455/462; 455/465

(58) Field of Classification Search ............... 455/411, 455/435.1, 462, 465, 74.1, 41.2; 370/493
See application file for complete search history.

(56) References Cited

U.S. PATENT DOCUMENTS

| 6,141,356 A | * | 10/2000 | Gorman ................ 370/493 |
| 2001/0044314 A1 | * | 11/2001 | Martensson et al. ........ 455/462 |
| 2004/0198354 A1 | * | 10/2004 | Pettine ................ 455/435.1 |

FOREIGN PATENT DOCUMENTS

DE 197 40 934 4/1999

(Continued)

*Primary Examiner*—Nick Corsaro
*Assistant Examiner*—Sylvia Mack
(74) *Attorney, Agent, or Firm*—Bell, Boyd & Lloyd LLP

(57) ABSTRACT

System and method for the registration of a mobile part (MT, OA, HA) in a base station (BS) in a telecommunication system designed for wireless communication between a mobile part (MT, OA, HA) and a base station (BS. The base station and the mobile part are initially placed in an access standby state. Subsequently, a verification procedure determines a message exchange (MA) between the mobile part and the base station if the base station supports a voice-controlled registration and if the mobile part is theoretically connected to the base station. If the theoretical connection is determined, a user channel connection suitable for the transmission of voice data is established between the mobile part and the base station. The mobile part is then either registered in the base station, or the registration attempt is rejected.

33 Claims, 5 Drawing Sheets

FOREIGN PATENT DOCUMENTS

| | | |
|---|---|---|
| EP | 0 667 078 | 8/1995 |
| WO | WO99/14956 | 3/1999 |
| WO | WO 01/15141 | 3/2001 |
| WO | WO 01/067435 | 9/2001 |
| WO | WO 03/003702 | 1/2003 |

* cited by examiner

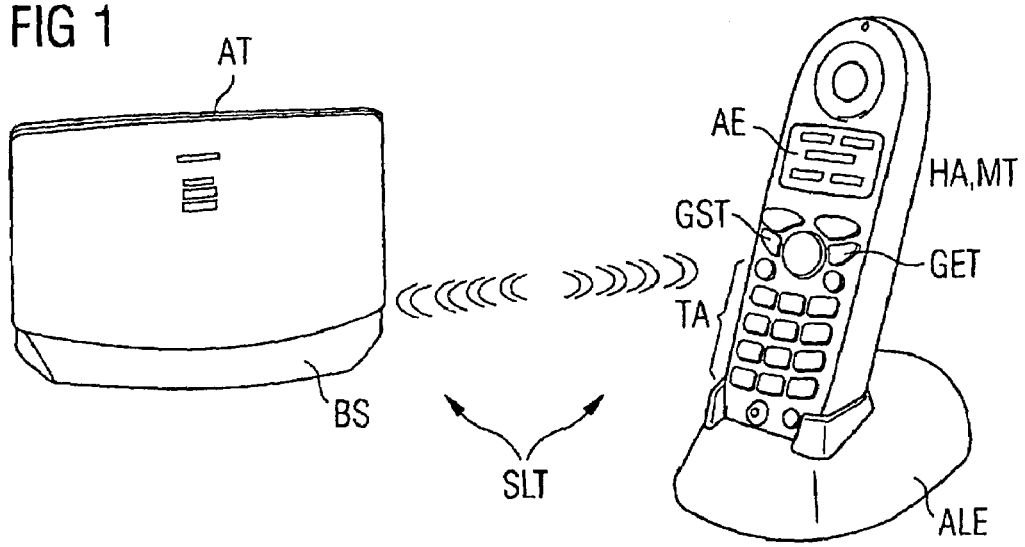
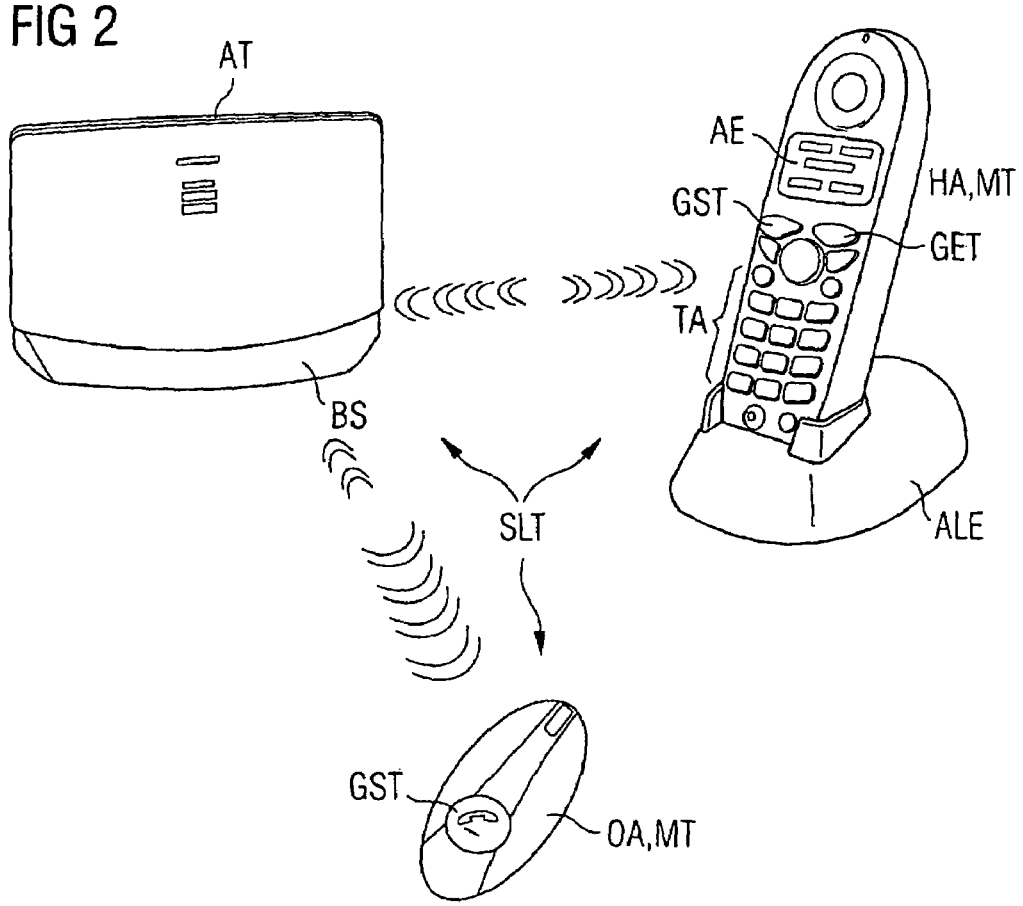

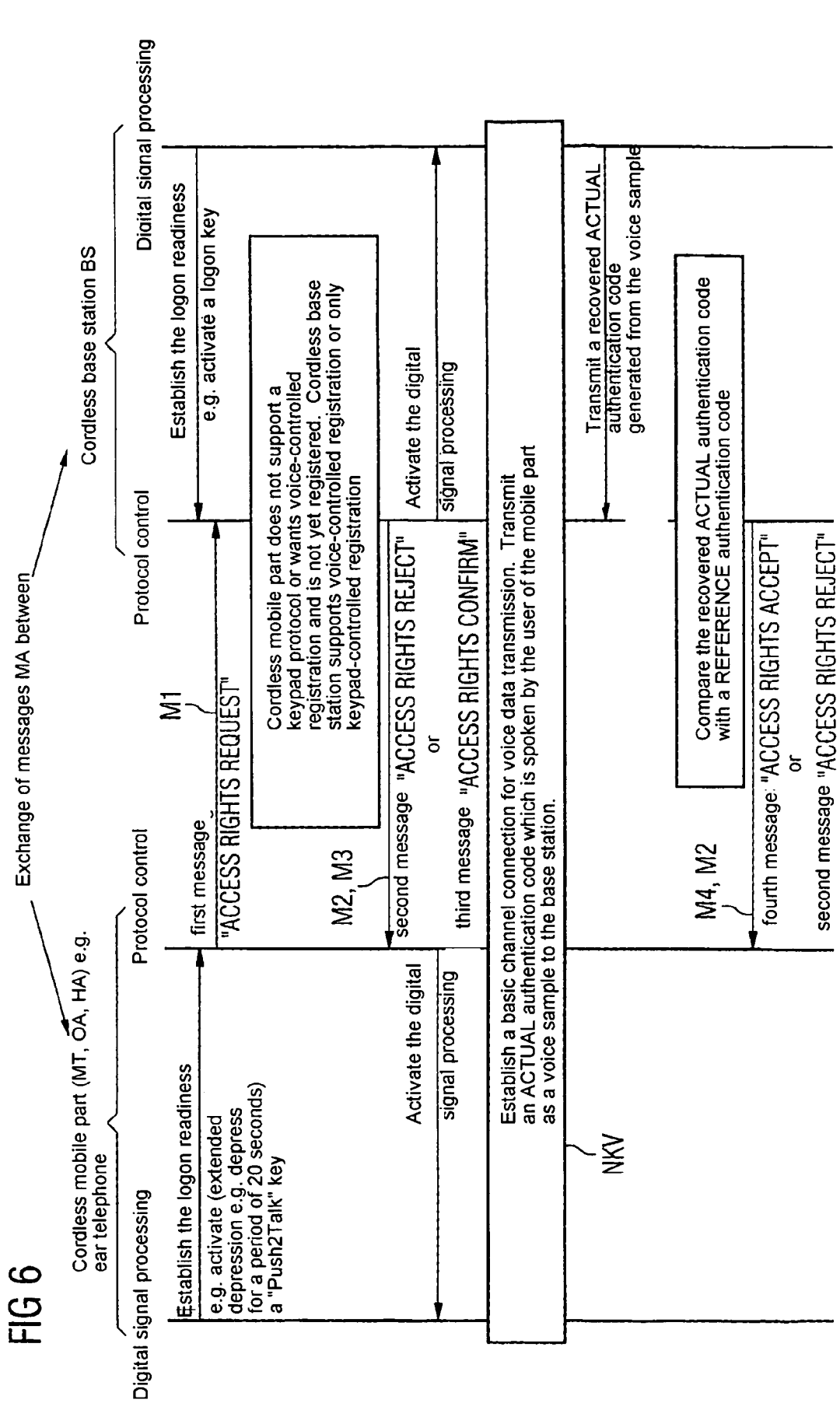

METHOD AND TELECOMMUNICATION SYSTEM INVOLVING WIRELESS TELECOMMUNICATION BETWEEN A MOBILE PART AND A BASE STATION FOR REGISTERING A MOBILE PART

FIELD OF TECHNOLOGY

The present invention is related generally to wireless telecommunication between a mobile part and a base station for registering a mobile part at a base station.

BACKGROUND

Telecommunication systems for wireless communication (having in each case at least one base station and at least one battery-operated mobile part) include, e.g., cordless telephones which have a cordless base station with an integrated or a separate battery charging device and at least one cordless mobile part. With the above telecommunication systems it is possible over short distances and in a mobile manner via the fixed network, e.g., the ISDN or PSTN, to telephone or make local and long-distance calls, i.e., voice data, to transmit or exchange packet-based data, e.g., SMS messages.

Moreover, within the foreseeable future there will also be cordless telecommunication systems which are suitable for the transmission of voice and packets over the Internet. Consequently, and despite the worldwide dominance of mobile radio devices (GSM handsets or soon UMTS handsets), there will also be a worldwide market for such cordless telecommunication systems in the future. The market possibly growing even bigger, however, particularly in view of the WLAN and IEEE 802.11 application scenarios that are currently under discussion. The DECT protocol is currently the most widespread protocol, in Europe at least, upon which such cordless telephones are based.

FIG. 1 illustrates a known cordless telephone SLT. Specifically, FIG. 1 illustrates a Siemens Gigaset 4175isdn that includes an ISDN-compatible cordless base station BS of the type Gigaset 4175isdn, a cordless handset HA of the type Gigaset 4000C developed to include convenient menu prompts (menu protocol), and a separate battery charging device ALE for charging the batteries in the cordless handset HA, which works or functions in accordance with the DECT protocol. The cordless handset HA features a display AE and a keypad TA on which are located, for example, an operating element that is developed as a start call key for starting a call GST and an operating element that is developed as an end call key for ending a call GET. The cordless base station BS has an operating element for establishing logon readiness AT, the operating element preferably being developed as an illuminated logon key, which flashes when it is activated.

In order to allow the use of such cordless telecommunication systems for wireless mobile telecommunication, the cordless telecommunication systems include two devices (cordless base station and cordless handset), which are "married" to each other. The marriage of the two devices occurs when the cordless handset HA is registered or logged on at the cordless base station BS. EP 0 667 078 B1 provides a detailed description of the fundamental way in which such a logon procedure takes place; in particular for DECT-specific cordless telecommunication systems.

Both during such a logon procedure and in advance of the logon procedure, i.e., when establishing logon readiness, all cordless telecommunication systems formerly required the user to act and, for example, switch both the base station and the handset to logon-ready in the defined sequence (i.e., by pressing the logon key AT or the start call key GST or the end call key GET, enter a personal identification code or so-called "PIN" (Personal Identification Number), and select an INTERNAL number for the handset). The logon key AT and the start call key GST or end call key GET are, therefore, means for establishing logon readiness with regard to the cordless base station BS and the cordless handset HA. These measures which had to be performed by the user were not exactly user-friendly, and the logon procedure was, therefore, performed in advance by manufacturers of such cordless telecommunication systems as part of the manufacturing process. Although this did improve the user-friendliness for the purchaser of such cordless telecommunication systems, it also increased the manufacturing costs at the same time. In order to avoid the necessity of the latter (increasing the manufacturing costs) without neglecting the former (improving the user-friendliness), WO03/003702 A1 provides for logging on battery-operated mobile parts at base stations.

This method includes the automatic establishment of the logon readiness between the mobile part which must be logged on and the base station, without the user of the telecommunication system having to carry out the measures that are described above. This is achieved by establishing the logon readiness for logging on the battery-operated mobile part at the base station including a battery charging device via charging contacts of the mobile part and of the base station. The logon procedure then taking place as before via the air interface of the telecommunication system.

The means for establishing logon readiness (with reference to the cordless base station including battery charging device and the cordless handset) include the battery charging device and the charging contacts. With the cordless telephone which is illustrated in FIG. 1 as its point of departure, a further evolution step in the development of cordless telephones includes miniaturizing the cordless handset HA, e.g., in the direction of cordless earphones and at the same time progressively introducing a voice-controlled user interface of the cordless handset HA. The objective is to move away from the current cordless handsets including user operation via keys and display, and move to more compact and smaller cordless handsets, e.g. "earplugs" which are designed as cordless earphones, in which the user operation is entirely voice-controlled. The "earplug" is functionally comparable with current cordless handsets, but without a display and keypad.

As a vision which has FIG. 1 as its point of departure, FIG. 2 illustrates the cordless telephone SLT of the type Gigaset 4175isdn being extended to include a cordless earphone OA. In comparison with the cordless handset HA which has been used until the present time, the cordless earphone OA which is designed as an "earplug" has only a single key, e.g., the start call key or "Push2Talk" key GST. Although the cordless handset HA and the cordless earphone OA clearly differ in terms of the user interface, they are both cordless mobile parts MT which must be registered at the cordless base station BS in the context of a logon procedure for the purpose of operating with the base station.

In the case of conventional user operation, the logon of a cordless mobile part at a cordless base station (registration) takes place in such a way that the cordless mobile part and the cordless base station are switched into a special logon mode and—as mentioned above—the "PIN" (Personal Identification Number) must be entered for user authentication at the cordless mobile part, so that it can be accepted by the cordless base station accordingly in the context of the logon procedure. This type of logon procedure which is based on conventional user operation requires that the cordless mobile part have a keypad and a display.

The omission of display and keypad in cordless earphones requires alternative forms of user operation when logging on a cordless mobile part at a cordless base station in the context of a logon procedure. A hardware-triggered automated logon procedure is, therefore, used in the known cordless telephones of Siemens such as the Gigaset 100 and Gigaset 200, for example. A further possibility for user operation during the logon is to use an existing voice-recognition infrastructure for voice-controlled user operation during the logon. In this case, the infrastructure is present in the telecommunication system (e.g., base station or mobile part) on the basis of the voice-controlled user interface which is provided in any case.

Cordless telephones which have an infrastructure for voice recognition are already available on the market. Examples include the Siemens cordless telephones of the type Gigaset (Series 4xxx), in which the base stations are equipped with voice controls. In accordance with WO 01/67435, these voice controls make it possible by speaking the name to dial the corresponding telephone number from a phone book which contains a maximum of 20 entries. This is a speaker-dependent method, in which, e.g., four different speakers can train a corresponding voice recognition facility using their specific voices in internal databases (Example: There are two users. Each user gives a voice sample for each entry. Therefore a maximum of 10 entries are possible.). This feature is comparable with the voice control which is integrated in mobile telephones.

All in all, therefore, the current voice controls are rudimentary in comparison with the possibilities which are created in accordance with WO 01/15141 by the new speaker-independent methods, the possibilities being based, e.g., on a "Hidden Markov Model." As a result of such speaker-independent methods, it is also possible for the first time to implement voice-controlled user operation when logging on a mobile part at a base station in the context of a logon procedure.

SUMMARY

The invention addresses the problem of specifying a method and telecommunication system (including wireless telecommunication between a mobile part and a base station) for registering a mobile part at a base station, wherein the registration of the mobile part at the base station is improved and simplified. In particular, mobile parts which do not have a suitable normally configured input medium, e.g., keypad or stylus-oriented input medium for entering characters, can be registered at a base station. Additionally, all other mobile parts which do have such an input medium can use the registration method as an alternative.

In accordance with an embodiment of the invention, for the purpose of registering a mobile part at a base station in a telecommunication system including wireless telecommunication between the mobile part and the base station, the mobile part and the base station are each switched to a logon-ready state initially. An exchange of messages between the mobile part and the base station in the context of a detection procedure then detects whether the base station supports a voice-controlled registration and the mobile part is, therefore, able in principle to logon at the base station.

If the ability to logon in principle is detected, a suitable basic channel connection which is known as a voice data path is then established between the mobile part and the base station. Otherwise, the mobile part detects whether it can logon to a different logon-ready base station. Finally, an ACTUAL authentication code in the mobile part, e.g., a PIN code, is examined to determine whether the ACTUAL authentication code is identical to a REFERENCE authentication code. If so, the mobile part is registered at the base station, otherwise, the registration attempt is rejected. It is preferably assumed that the mobile part, e.g., a cordless handset or a cordless earphone, sets up the voice channel to the base station and the base station contains the voice recognition facility. This has the advantage that the "intelligence" is situated in the cordless base station, whereby the cordless handset or the cordless earphone can be very light and inexpensive in structure.

Alternatively, however, it is also possible to carry out the voice recognition in the cordless handset or in the cordless earphone. However, this means that an ACTUAL authentication code which is recovered from the spoken ACTUAL authentication code must be transmitted to the cordless base station in an encrypted manner for the comparison with the REFERENCE authentication code. Irrespective of which of these alternatives is used, the fundamental concept of carrying out the registration of a mobile part at a base station by means of voice recognition requires new technological approaches. The study of these approaches is, however, meaningful because within the framework of the "Handfree home" product vision, such voice-controlled user-friendly cordless telephones can only be implemented using the proposed concept. This includes:

Establishing the logon-readiness at mobile part and base station;

Establishing the voice data path between mobile part and base station;

Speaking a "PIN" for authentication of the mobile part; and

Speaker-independent speaker recognition using number sequence recognition. The mobile part must be able to distinguish between a base station which has voice control and a base station which is not voice-controlled.

In accordance with an embodiment of the invention, following a rejected registration attempt, the registration is repeated at least once before the registration fails definitively. In the detection procedure, it is appropriate for the mobile part to continue to check whether it is able to logon at another logon-ready base station until no further logon-ready base station can be found by the mobile part. Additionally, logon-readiness can be advantageously established in the mobile part, depending on the type of design, and in the base station.

Another embodiment of the invention is concerned in each case with which medium can be used advantageously for the exchange of messages, for example. This takes place via charging contacts in a battery charging device of the base station if the mobile part is located in said battery charging device. This take place via air interfaces in the base station and in the mobile part. Messages are preferably transmitted in the context of the exchange of messages.

In accordance with an embodiment of the invention, it is advantageous if the basic channel connection is established by the base station. In order to notify the user of the mobile part about the establishment of the basic channel connection, it is appropriate to transmit a welcome text from the base station to the mobile part, e.g. with the wording "You want to logon your mobile part. Please speak the PIN code."

In accordance with an embodiment of the present invention, the examination of whether the ACTUAL authentication code is identical to the REFERENCE authentication code takes place in the base station wherein, after a voice sample corresponding to the spoken ACTUAL authentication code has been analyzed and a recovered ACTUAL authentication code for comparison with the REFERENCE authentication code has been generated from the voice sample, a code signal which is generated from the spoken ACTUAL authentication code and contains the voice sample is transmitted from the mobile part to the base station. In order to notify the user of the mobile part about the successful registration, it is appropriate to transmit an information text from the base station to the mobile part, e.g. with the wording "You are logged on. You have the internal subscriber number 'xyz'."

BRIEF DESCRIPTION OF THE FIGURES

FIG. 1 illustrates a known cordless telephone SLT.

FIG. 2 illustrates the cordless telephone SLT of the type Gigaset 4175isdn being extended to include a cordless earphone OA.

FIG. 6 uses a message status diagram to show the message flow when exchanging messages between the cordless mobile part and the cordless base station in relation to the voice-controlled registration of the mobile part at the base station in accordance with the FIGS. 3 and 4.

DETAILED DESCRIPTION

Figure 3:
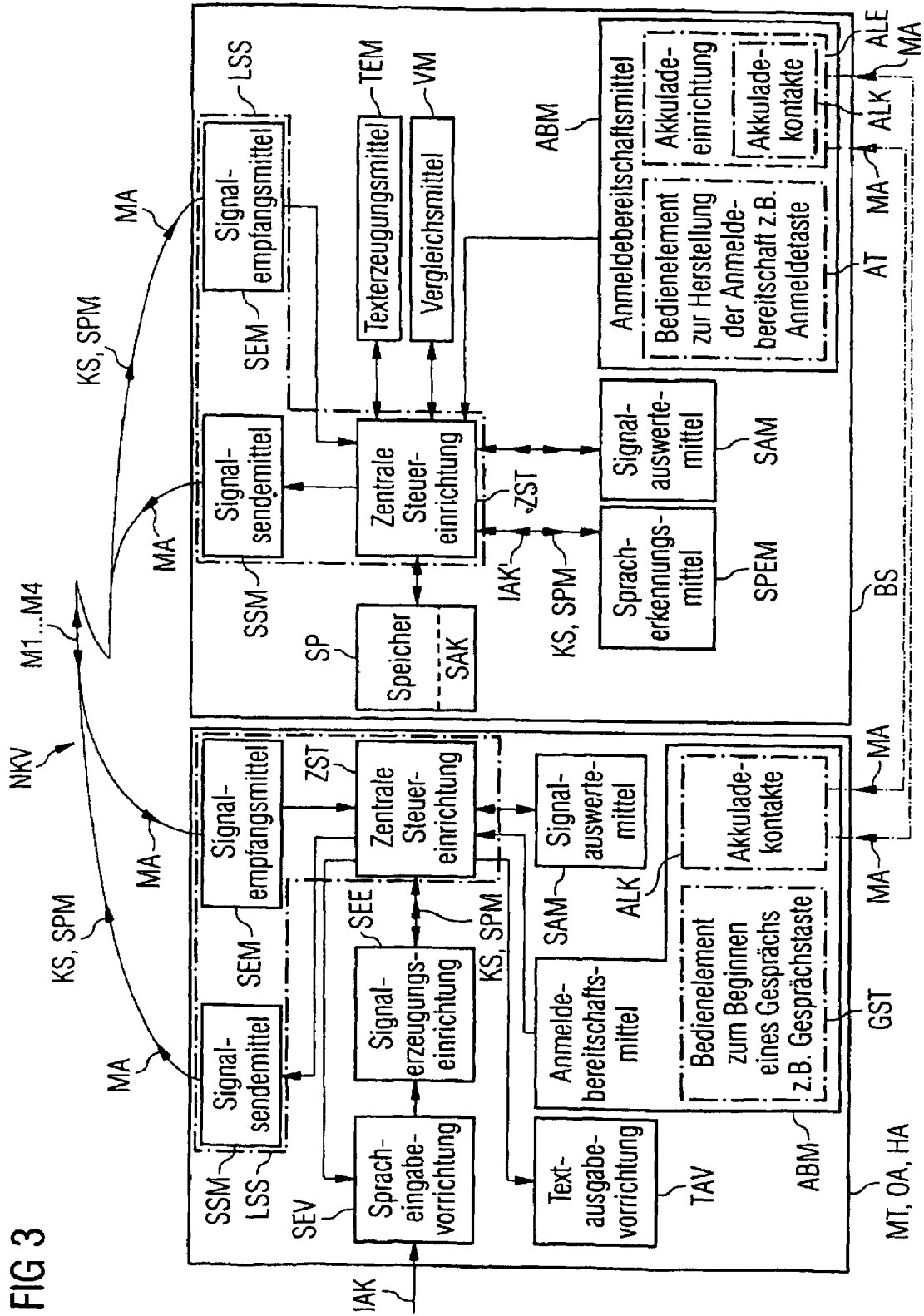
FIG. 3 illustrate the underlying structure of a cordless mobile part and a cordless base station for the voice-controlled registration of the mobile part at the base station, according to which the voice recognition takes place in the base station.

FIG. 3 illustrates the underlying structure of a cordless mobile part MT, OA, HA (which can be designed in accordance with the FIGS. 1 and 2 either as a conventional cordless handset HA or as a cordless earphone OA) and of a cordless base station BS for the voice-controlled registration of the mobile part MT, OA, HA at the base station BS, wherein the voice recognition for the voice-controlled registration takes place in the cordless base station BS.

The registration of the mobile part MT, OA, HA at the base station BS normally takes place via the air. For this purpose, signal transmission means SSM and signal reception means SEM are present in each case in both the cordless base station BS and in the cordless mobile part MT, OA, HA. A radio-based exchange of messages MA takes place via the air between the signal transmission means SSM and the signal reception means SEM in the cordless base station BS and in the cordless mobile part MT, OA, HA. In the context of this exchange of messages MA, a multiplicity of messages M1 . . . M4 in particular are transmitted between the cordless base station BS and the cordless mobile part MT, OA, HA. The individual messages are specified in the description of FIG. 6.

Alternatively to the voice-controlled registration of the cordless mobile part MT, OA, HA via the air, it is also possible (as described in the published international patent applications WO 99/14956 A2 and WO 03/003702 A1 in each case) for the cordless mobile part MT, OA, HA to register itself at the cordless base station BS not via the air, but instead to use battery charging contacts ALK which are present in both the cordless mobile part MT, OA, HA and in the cordless base station BS for this registration. In this case, the cordless mobile part MT, OA, HA is located in a battery charging device ALE of the cordless base station BS. The aforementioned exchange of messages MA then preferably takes place at least partially via this conductor-based connection between the battery charging contacts ALK. This alternative exchange of messages between the battery charging contacts ALK is illustrated by two broken-line double arrows in FIG. 3.

The battery charging contacts ALK in the cordless mobile part MT, OA, HA and the cordless base station BS are in each case directly or indirectly assigned to logon readiness means ABM. While the battery charging contacts ALK in the cordless mobile part MT, OA, HA are directly and in addition to an operating element for starting a call, e.g., a call key GST, assigned to the logon readiness means ABM. The battery charging contacts ALK in the cordless base station BS are part of the battery charging device ALE, wherein this is likewise and in addition to an operating element for establishing the logon readiness, e.g., a logon key AT, directly assigned to the logon readiness means ABM in the cordless base station BS.

The logon readiness means ABM, the signal transmission means SSM and the signal reception means SEM in the cordless mobile part MT, OA, HA and in the cordless base station BS are assigned in each case to a central control device ZST, which controls operating flows and functional flows in each case in the cordless mobile part MT, OA, HA and in the cordless base station BS. The signal transmission means SSM and signal reception means SEM form an air interface (LSS) with the central control device ZST in each case. In addition to the previously mentioned signal transmission and reception means SSM, SEM, the central control device ZST in the cordless mobile part MT, OA, HA is also assigned a voice input device SEV, a signal generating device SEE, a text output device TAV and signal analysis means SAM. In addition to the signal transmission and reception means SSM, SEM, the central control device ZST in the cordless base station BS is also assigned a memory SP containing a REFERENCE authentication code SAK, which is preferably developed as a PIN code (Personal Identification Number), a text generating means TEM, comparison means VM, voice recognition means SPEM and signal analysis means SAM.

For the purpose of registering the cordless mobile part MT, OA, HA at the cordless base station BS, both are initially switched to a state for the reciprocal logon, said state being called the logon readiness state. This logon readiness state can be produced in different ways, irrespective of whether the exchange of messages MA takes place via the air and/or via the conductor connection between the battery charging contacts ALK. On one hand therefore, it is possible to set the logon readiness in a known manner (cf. the publications WO 99/14956 A2 and WO 03/003702 A1) using the battery charging contacts ALK in the battery charging device ALE with the battery charging contacts ALK of the cordless base station BS. Alternatively, it is also possible to establish the logon readiness of the cordless base station BS by activating the operating element for establishing the logon readiness, e.g. the logon key AT, and for the logon readiness of the cordless mobile part MT, OA, HA to be established by activating the operating element for starting a call, e.g. the start call key GST.

Following thereupon, provision is made between the cordless mobile part MT, OA, HA and the cordless base station BS, using the exchange of messages MA within the context of a detection procedure, to detect whether the cordless base station BS supports a voice-controlled registration and therefore whether the cordless mobile part MT, OA, HA is able in principle to logon at the cordless base station BS (cf. FIG. 6). The messages M1 . . . M4 which are transmitted in this exchange of messages MA are received in each case by the signal reception means SEM and analyzed by the signal analysis means SAM under the control of the central control device ZST. If the logon capability of the cordless mobile part MT, OA, HA at the cordless base station BS is established in principle as a result of this analysis, a basic channel connection NKV which is suitable for voice data transmission is set up between the cordless mobile part MT, OA, HA and the cordless base station BS.

Figure 5:
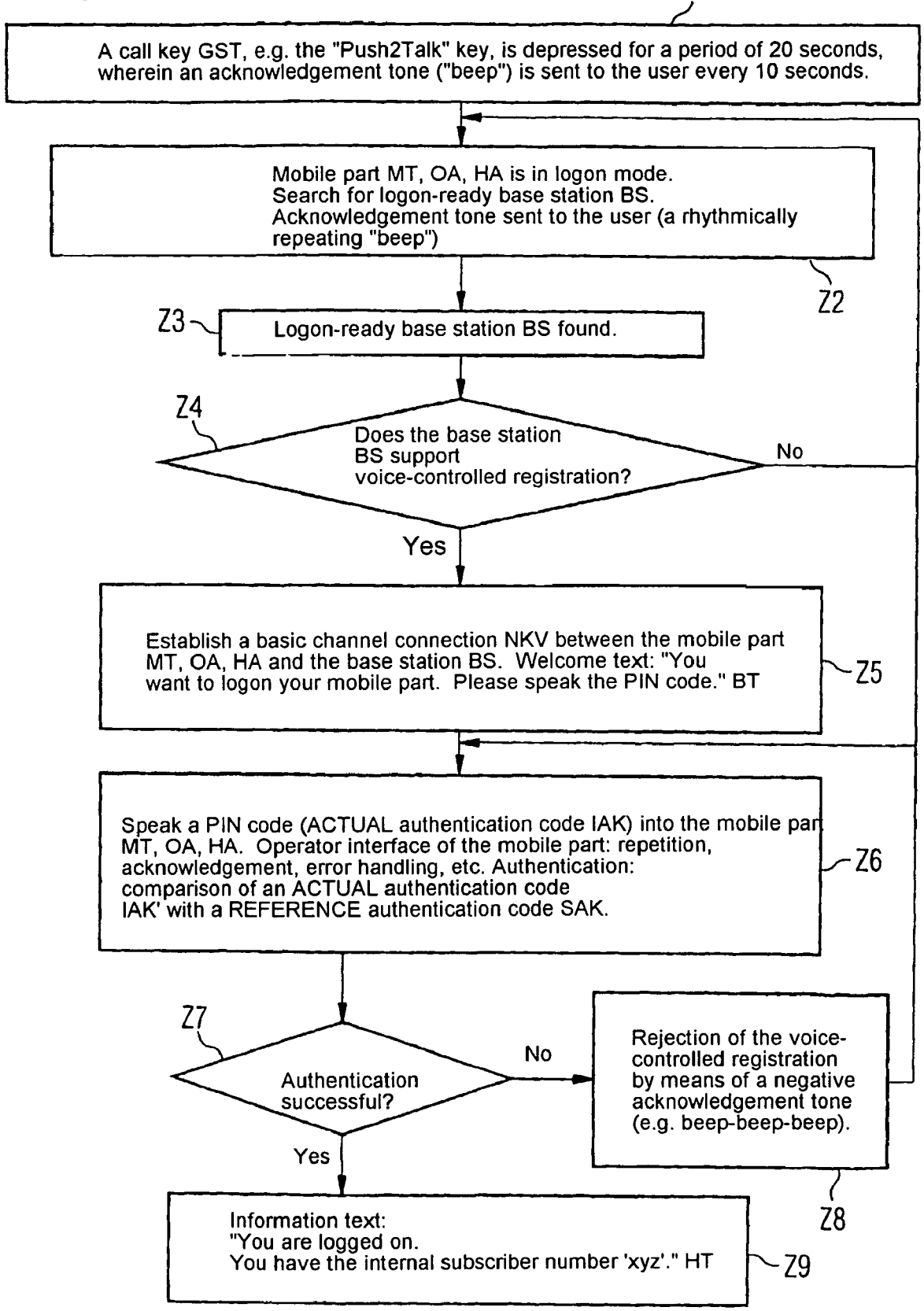
FIG. 5 illustrates a flow diagram for the cordless mobile part in relation to its voice-controlled registration at the cordless base station in accordance with the FIGS. 3 and 4.

Conversely, if the analysis finds that the cordless base station BS does not support a voice-controlled registration (whereby the cordless mobile part MT, OA, HA is not able to logon using a voice-controlled logon) the registration attempt of the cordless mobile part MT, OA, HA at the cordless base station BS fails and the only remaining course of action for the cordless mobile part MT, OA, HA is to attempt to logon to another logon-ready cordless base station BS (cf. FIG. 5). The starting of a new registration attempt following a failed attempt and the exchange of messages MA (i.e., in the context of the detection procedure for detecting whether the cordless mobile part MT, OA, HA is able to logon to another logon-ready cordless base station BS) continues until no further logon-ready cordless base station BS is found by the cordless mobile part MT, OA, HA.

Following the setup of the basic channel connection NKV, the user of the cordless mobile part MT, OA, HA is optically and/or acoustically prompted by means of the text output device TAV to enter an ACTUAL authentication code IAK into the voice input device SEV. The prompt to the user of the cordless mobile part MT, OA, HA preferably takes place as per FIG. 5 in the form of a welcome text BT including the wording "you want to logon your mobile part;" or "please speak the PIN code." This welcome text BT is preferably generated by the text generating means TEM in the cordless base station BS and transmitted from the air interface (LSS) in the cordless base station BS to the cordless mobile part MT, OA, HA via the basic channel connection NKV. Alternatively, however, it is also possible for the welcome text BT to be stored already by default in the cordless mobile part MT, OA, HA and then, after a logon-ready cordless base station BS which has a voice control has been found and the basic channel connection NKV has been set up, output by the text output device TAV.

A code signal KS containing a voice sample SPM is generated in the signal generating device SEE from the ACTUAL authentication code IAK which is entered into the voice input device SEV by the user of the cordless mobile part MT, OA, HA, the ACTUAL authentication code IAK being preferably developed as a spoken PIN. The code signal KS including the voice sample SPM is then transmitted under the control of the central control device ZST via the signal transmission means SSM and the air to the cordless base station BS, where it is received by the signal reception means SEM. Under the control of the central control device ZST, a recovered ACTUAL authentication code IAK' is generated by the voice recognition means SPM in the cordless base station BS from the received code signal KS and the voice sample SPM which is contained therein. Under the control of the central control device ZST, this recovered ACTUAL authentication code IAK' is compared by the comparison means VM with the REFERENCE authentication code SAK which is stored in the memory SP.

If this comparison which is carried out by the comparison means VM indicates that the recovered ACTUAL authentication code IAK' matches the REFERENCE authentication code SAK, i.e., is identical, the cordless mobile part MT, OA, HA is registered at the cordless base station BS. Conversely, if the recovered ACTUAL authentication code IAK' does not match the stored REFERENCE authentication code SAK, the cordless base station BS rejects the registration attempt by the cordless mobile part MT, OA, HA accordingly. Before the voice-controlled registration fails definitively following a rejected registration attempt, the registration attempt is preferably repeated at least once in accordance with the explanations for FIG. 5 in order to avoid an incorrect code input or the case in which so many cordless mobile parts MT, OA, HA are already logged on or registered at the cordless base station BS (the logon quota of the cordless base station is exhausted) that no further cordless mobile part MT, OA, HA can be logged on at the cordless base station BS.

Figure 4:
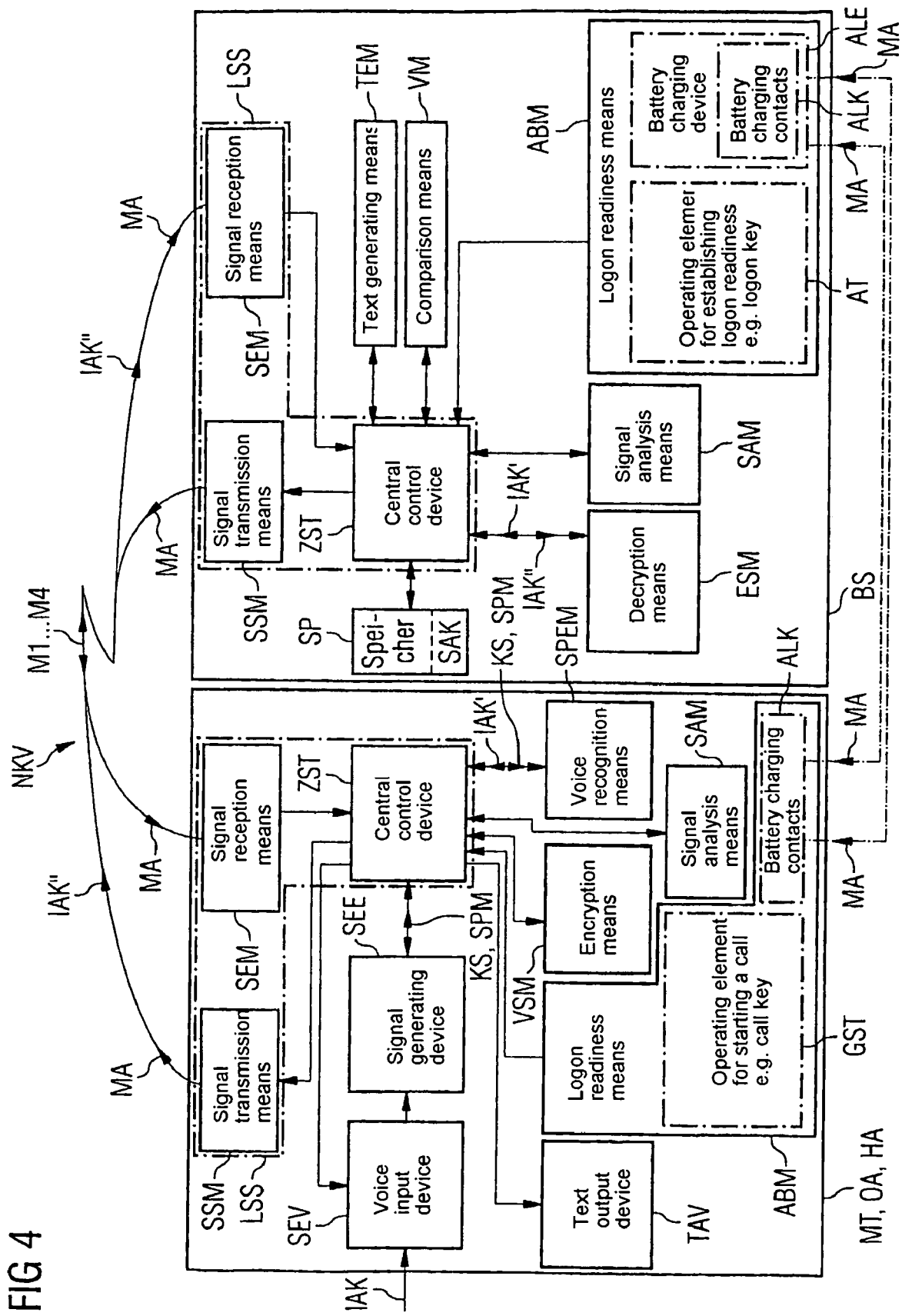
FIG. 4 illustrate the underlying structure of a cordless mobile part and a cordless base station for the voice-controlled registration of the mobile part at the base station, according to which the voice recognition takes place in the mobile part.

Taking FIG. 3 as a starting point, FIG. 4 illustrates the underlying structure of a cordless mobile part MT, OA, HA, which can be designed in accordance with the FIGS. 1 and 2 either as a conventional cordless handset HA or as a cordless earphone OA, and of a cordless base station BS for the voice-controlled registration of the mobile part MT, OA, HA at the base station BS. Unlike the cordless mobile part MT, OA, HA in FIG. 3, the voice recognition for the voice-controlled registration takes place in the cordless mobile part MT, OA, HA. The registration of the mobile part MT, OA, HA at the base station BS normally takes place via the air. For this purpose, the signal transmission means SSM and signal reception means SEM are present in each case in both the cordless base station BS and in the cordless mobile part MT, OA, HA. A radio-based exchange of messages MA again takes place via the air between the signal transmission means SSM and the signal reception means SEM in the cordless base station BS and in the cordless mobile part MT, OA, HA. In the context of this exchange of messages MA, the messages M1 . . . M4 in particular are again transmitted between the cordless base station BS and the cordless mobile part MT, OA, HA, the messages being specified individually in the description of FIG. 6.

Alternatively to the voice-controlled registration of the cordless mobile part MT, OA, HA via the air, it is again also possible (as described in the published international patent applications WO 99/14956 A2 and WO 03/003702 A1 in each case) for the cordless mobile part MT, OA, HA to register itself at the cordless base station BS not via the air, but instead to use the battery charging contacts ALK. The battery charging contacts ALK are present in both the cordless mobile part MT, OA, HA and in the cordless base station BS for this registration, if the cordless mobile part MT, OA, HA is located in a battery charging device ALE of the cordless base station BS. The aforementioned exchange of messages MA then preferably takes place at least partially via this conductor-based connection between the battery charging contacts ALK. This alternative exchange of messages between the battery charging contacts ALK is illustrated by two broken-line double arrows in FIG. 4.

The battery charging contacts ALK in the cordless mobile part MT, OA, HA and the cordless base station BS are again in each case directly or indirectly assigned to the logon readiness means ABM. While the battery charging contacts ALK in the cordless mobile part MT, OA, HA are directly and in addition to the operating element for starting a call, e.g., the call key GST, assigned to the logon readiness means ABM, the battery charging contacts ALK in the cordless base station BS are part of the battery charging device ALE. This is likewise and in addition to the operating element for establishing the logon readiness, e.g. the logon key AT, directly assigned to the logon readiness means ABM in the cordless base station BS.

The logon readiness means ABM, the signal transmission means SSM and the signal reception means SEM in the cordless mobile part MT, OA, HA and in the cordless base station BS are assigned again in each case to the central control device ZST. The central control device ZST controls the operating flows and functional flows in each case in the cordless mobile part MT, OA, HA and in the cordless base station BS. The signal transmission means SSM and signal reception means SEM again form the air interface (LSS) with the central control device ZST in each case.

In contrast with the cordless mobile part MT, OA, HA in FIG. 3, the central control device ZST in the cordless mobile part MT, OA, HA is not only assigned the voice input device SEV, the signal generating device SEE, the text output device TAV and the signal analysis means SAM in addition to the previously mentioned signal transmission and reception means SSM, SEM, but also encryption means VSM and voice recognition means SPEM. In contrast with the cordless base station BS in FIG. 3, the central control device ZST in the cordless base station BS is also assigned decryption means ESM in addition to the signal transmission and reception means SSM, SEM, the memory SP containing the REFERENCE authentication code SAK which is preferably developed as a PIN code (Personal Identification Number), the text generating means TEM, the comparison means VM and the signal analysis means SAM.

For the purpose of registering the cordless mobile part MT, OA, HA at the cordless base station BS, both are again initially switched to the logon readiness state. This logon readiness state can again be produced in different ways, irrespective of whether the exchange of messages MA takes place via the air and/or via the conductor connection between the battery charging contacts ALK. On one hand, therefore, it is possible to set the logon readiness in a known manner (cf. the publications WO 99/14956 A2 and WO 03/003702 A1) using the battery charging contacts ALK in the battery charging device ALE with the battery charging contacts ALK of the cordless base station BS. Alternatively, it is also possible to establish the logon readiness of the cordless base station BS by activating the operating element for establishing the logon readiness, e.g., the logon key AT, and for the logon readiness of the cordless mobile part MT, OA, HA to be established by activating the operating element for starting a call, e.g. the start call key GST.

Following thereupon, provision is again made between the cordless mobile part MT, OA, HA and the cordless base station BS, using the exchange of messages MA within the context of the detection procedure, to detect whether the cordless base station BS supports a voice-controlled registration and, therefore, whether the cordless mobile part MT, OA, HA is able in principle to logon at the cordless base station BS (cf. FIG. 6). The messages M1 ... M4 which are transmitted in this exchange of messages MA are again received in each case by the signal reception means SEM and analyzed by the signal analysis means SAM under the control of the central control device ZST. If the logon capability of the cordless mobile part MT, OA, HA at the cordless base station BS is established in principle again as a result of this analysis, the basic channel connection NKV which is suitable for voice data transmission is set up between the cordless mobile part MT, OA, HA and the cordless base station BS.

Conversely, if the analysis finds that the cordless base station BS does not support a voice-controlled registration, whereby the cordless mobile part MT, OA, HA is not able to logon using a voice-controlled logon, the registration attempt of the cordless mobile part MT, OA, HA at the cordless base station BS fails as in FIG. 3 and the only remaining course of action for the cordless mobile part MT, OA, HA is to attempt to logon to another logon-ready cordless base station BS (cf. FIG. 5). The starting of a new registration attempt following a failed attempt and the exchange of messages MA (i.e., in the context of the detection procedure for detecting whether the cordless mobile part MT, OA, HA is able to logon to another logon-ready cordless base station BS) continues again until no further logon-ready cordless base station BS is found by the cordless mobile part MT, OA, HA.

Following the setup of the basic channel connection NKV, the user of the cordless mobile part MT, OA, HA is again optically and/or acoustically prompted by means of the text output device TAV to enter the ACTUAL authentication code IAK into the voice input device SEV. The prompt to the user of the cordless mobile part MT, OA, HA preferably takes place as per FIG. 5 again in the form of a welcome text BT including the wording "you want to logon your mobile part;" or "please speak the PIN code." This welcome text BT is again preferably generated by the text generating means TEM in the cordless base station BS and transmitted from the air interface (LSS) in the cordless base station BS to the cordless mobile part MT, OA, HA via the basic channel connection NKV.

Alternatively, however, it is again also possible for the welcome text BT to be stored already by default in the cordless mobile part MT, OA, HA. Then, after a logon-ready cordless base station BS (which has s voice control) has been found and the basic channel connection NKV has been set up), the welcome text BT can be output by the text output device TAV. The code signal KS containing the voice sample SPM is again generated in the signal generating device SEE from the ACTUAL authentication code IAK, which is entered into the voice input device SEV by the user of the cordless mobile part MT, OA, HA. The ACTUAL authentication code IAK is preferably developed as a spoken PIN.

In contrast with FIG. 3, the code signal KS including the voice sample SPM is not then transmitted via the signal transmission means SSM and the air to the signal reception means SEM of the cordless base station BS, but is routed under the control of the central control device ZST to the voice recognition means SPEM in the cordless mobile part MT, OA, HA. In this voice recognition means SPEM, the recovered ACTUAL authentication code IAK' is again generated from the code signal KS containing the voice sample SPM under the control of the central control device ZST. This recovered ACTUAL authentication code IAK' is then encrypted by the encryption means VSM under the control of the central control device ZST, and subsequently transmitted in encrypted form IAK" via the signal transmission means SSM and the air to the cordless base station BS, where it is received by the signal reception means SEM. Under the control of the central control device ZST, the received encrypted recovered ACTUAL authentication code IAK' is decrypted by the decryption means ESM in the cordless base station BS, then compared again by the comparison means VM with the REFERENCE authentication code SAK which is stored in the memory SP.

If this comparison which is carried out by the comparison means VM indicates that the recovered ACTUAL authentication code IAK' matches the REFERENCE authentication code SAK, i.e., is identical, the cordless mobile part MT, OA, HA is registered at the cordless base station BS as in the FIG. 3. Conversely, if the recovered ACTUAL authentication code IAK' does not match the stored REFERENCE authentication code SAK, the cordless base station BS rejects the registration attempt by the cordless mobile part MT, OA, HA accordingly as in the FIG. 3.

Before the voice-controlled registration fails definitively following a rejected registration attempt, the registration attempt is again preferably repeated at least once in accordance with the explanations for FIG. 5 in order to avoid an incorrect code input or the case in which so many cordless mobile parts MT, OA, HA are already logged on or registered at the cordless base station BS (i.e., the logon quota of the cordless base station is exhausted) that no further cordless mobile part MT, OA, HA can be logged on at the cordless base station BS.

FIG. 5 illustrates a flow diagram for the cordless mobile part with reference to its voice-controlled registration at the cordless base station BS in accordance with the FIGS. 3 and 4. In a first state the start call key GST, which can be developed e.g. as a "Push2Talk" key, is depressed for a period of 20 seconds in the cordless mobile part MT, OA, HA. In this case, an acknowledgment tone ("beep") is sent to the user every ten seconds as a result of this key depression. As a result of this depression of the start call key GST, the cordless mobile part MT, OA, HA finds itself in a second state Z2 in a logon mode. In this mode, the cordless mobile part MT, OA, HA searches for a logon-ready cordless base station BS. During this search, an acknowledgement tone is output to the user, said tone being developed as a rhythmically repeating "beep."

In a third state Z3, the cordless mobile part MT, OA, HA has found a logon-ready cordless base station BS. In a fourth state Z4 following thereupon, the cordless mobile part MT, OA, HA inquires whether the cordless base station BS which was found in the third state Z3 supports a voice-controlled registration. If this is not the case, it returns again from the fourth state Z4 to the second state Z2, in which the cordless mobile part MT, OA, HA searches for a further logon-ready cordless base station BS. However, if the logon-ready cordless base station BS which was found in the third state Z3 supports the voice-controlled registration, it goes from the query state Z4 into a fifth state Z5, in which the basic channel connection NKV is established between the cordless base station BS and the cordless mobile part MT, OA, HA. The cordless base station BS transmits the welcome text BT which has the wording "You want to logon your mobile part. Please speak the PIN code." to the cordless mobile part MT, OA, HA via this basic channel connection.

In a sixth state Z6 following thereupon, the ACTUAL authentication code IAK which is developed as a PIN code is spoken into the cordless mobile part MT, OA, HA. A repetition, acknowledgment, error handling, etc. of the spoken code input is carried out via the operator interface of the cordless mobile part MT, OA, HA if necessary. The authentication in which the ACTUAL authentication code IAK' is compared with the REFERENCE authentication code SAK also takes place in this sixth state Z6.

It subsequently goes into a seventh state Z7 in which a query ascertains whether the authentication that was carried out in the sixth state was successful, i.e., whether the ACTUAL authentication code IAK' and the REFERENCE authentication code SAK in the sixth state Z6 match. If this is not the case, i.e. the ACTUAL authentication code IAK' and the REFERENCE authentication code SAK do not match in the sixth state Z6, it goes into a eighth state Z8 in which the rejection of the voice-controlled registration is indicated in the cordless mobile part MT, OA, HA by means of a negative acknowledgement tone (e.g. beep-beep-beep). The rejection of the voice-controlled registration of the cordless mobile part MT, OA, HA in the eighth state Z8 can be the result of an incorrect code input in the sixth state Z6 or it can occur because so many cordless mobile parts MT, OA, HA are already logged on or registered at the cordless base station BS which was found in the third state Z3 (the logon quota of the cordless base station is exhausted) that no further cordless mobile part MT, OA, HA can be logged on at the cordless base station BS. In the first of the aforementioned cases, it returns from the eighth state Z8 back to the sixth state Z6 in which the user of the cordless mobile part MT, OA, HA speaks another code into the cordless mobile part and therefore starts a new registration attempt.

In the second case, it goes from the eighth state Z8 back into the second state Z2 in which the cordless mobile part MT, OA, HA searches for another logon-ready cordless base station BS. Conversely, if the authentication query in the seventh state Z7 is successful, i.e., if the ACTUAL authentication code IAK' and the REFERENCE authentication code SAK match in the sixth state Z6, an information text HT with the wording "You are logged on. You have the internal subscriber number 'xyz'" is optically and/or acoustically output at the cordless mobile part MT, OA, HA in a ninth state Z9. Like the welcome text BT, and in accordance with the explanations for FIGS. 3 and 4, this information text HT is again preferably generated by the text generating means TEM in the cordless base station BS and transmitted by the air interface (LSS) in the cordless base station BS via the basic channel connection NKV to the cordless mobile part MT, OA, HA, where it is output by the text output device TAV. Alternatively however, it is also possible for the information text HAT to be stored already in the cordless mobile part MT, OA, HA by default again, like the welcome text BT, and then output by the text output device TAV after the registration is complete.

FIG. 6 illustrates the message flow for the exchange of messages MA between the cordless mobile part MT, OA, HA and the cordless base station BS in relation to the voice-controlled registration of the cordless mobile part MT, OA, HA at the cordless base station BS in accordance with the FIGS. 3 and 4. In the illustration of the message flow, a distinction is made between a "digital signal processing" entity and a "protocol control" entity in both the cordless mobile part MT, OA, HA and in the cordless base station BS. With reference to the exchange of messages MA between the cordless mobile part MT, OA, HA and the cordless base station BS, this signifies that the message flow which is relevant for the exchange of messages MA takes place between the "protocol control" entity in the cordless mobile part MT, OA, HA and the "protocol control" entity in the cordless base station BS.

The establishment of the logon readiness is initially signaled to the "protocol control" entity by the "digital signal processing" entity in both the cordless mobile part MT, OA, HA and the cordless base station BS. As already explained in the description of FIG. 5, the logon readiness is established in this case by means of a prolonged depression (e.g. 20 seconds) of the "Push2Talk" key at the cordless mobile part MT, OA, HA and by pressing the logon key at the cordless base station BS. When the "protocol control" entity in the cordless mobile part MT, OA, HA is notified about the establishment of the logon readiness, it transmits a first message "ACCESS RIGHTS REQUEST" M1 to the "protocol control" entity of the cordless base station BS via the air interface (LSS) in the FIGS. 3 and 4. The cordless mobile part MT, OA, HA introduces itself to the cordless base station BS using this first message M1, i.e., it informs, e.g., the cordless base station BS that it does not support a keypad protocol. Furthermore, the cordless mobile part MT, OA, HA uses the first message M1 in the context of the voice-controlled registration at the cordless base station BS to request access rights there.

The "protocol control" entity in the cordless base station BS receiving this first message M1 responds to the first message M1, depending on whether the cordless base station BS is a base station which supports only keypad-controlled registration or which supports voice-controlled registration, using either a second message "ACCESS RIGHTS REJECT" M2 or a third message "ACCESS RIGHTS CONFIRM" M3. If the "protocol control" entity in the cordless base station BS transmits the second message M2 to the "protocol control" entity in the cordless mobile part MT, OA, HA, the registration attempt of the cordless mobile part MT, OA, HA is terminated in accordance with the explanations for the FIGS. 3 to 5 because the voice-controlled registration is not supported by the cordless base station BS. In this case, the cordless mobile part MT, OA, HA will search for another logon-ready cordless base station BS and transmit the first message M1 to the cordless base station BS in each case as described in the FIGS. 3 to 5 until it is no longer able to find another logon-ready cordless base station BS.

Conversely, if the "protocol control" entity in the cordless base station BS transmits the third message M3 to the "protocol control" entity in the cordless mobile part MT, OA, HA, the cordless base station BS in this third message M3 grants the cordless mobile part MT, OA, HA its request for the access rights because it supports the voice-controlled registration. As a result of the transmission of the third message M3 from the cordless base station BS to the cordless mobile part MT, OA, HA, the "digital signal processing" entity is activated by the "protocol control" entity in both the cordless base station BS and the cordless mobile part MT, OA, HA. Following the activation of the "digital signal processing" entity, the basic channel connection NKV for voice transmission is established between the cordless mobile part MT, OA, HA and the cordless base station BS as described in the FIGS. 3 to 5. In accordance with the explanations for FIG. 3, the cordless mobile part MT, OA, HA transmits an ACTUAL authentication code which is spoken by the user of the mobile part to the cordless base station BS as a voice sample. In the "digital signal processing" entity of the cordless base station BS, a recovered ACTUAL authentication code is generated from the transmitted voice sample and transmitted to the "protocol control" entity in the cordless base station BS. The recovered ACTUAL authentication code is then compared with a REFERENCE authentication code in the "protocol control" entity as described in FIG. 3.

If the recovered ACTUAL authentication code matches the REFERENCE authentication code, i.e., if these are identical, the "protocol control" entity in the cordless base station BS transmits a fourth message "ACCESS RIGHTS ACCEPT" M4 to the "protocol control" entity in the cordless mobile part MT, OA, HA. As a result of this fourth message M4, the cordless mobile part MT, OA, HA receives the access rights from the cordless base station BS. Conversely, if the recovered ACTUAL authentication code does not match the REFERENCE authentication code, the "protocol control" entity in the cordless base station BS transmits the second message "ACCESS RIGHTS REJECT" M2 to the "protocol control" entity in the cordless mobile part MT, OA, HA. As a result of this second message M2, the access rights of the cordless mobile part MT, OA, HA on the cordless base station BS are refused by the cordless base station BS.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method for registering a mobile part at a base station in a telecommunication system having wireless telecommunication between the mobile part and the base station, comprising:

establishing a readiness for reciprocal logon or so-called logon readiness in each case for the mobile part (MT, OA, HA) and the base station (BS);

exchanging of messages (MA) between the mobile part (MT, OA, HA) and the base station (BS) in the context of a detection procedure that detects whether the base station (BS) supports a voice-controlled registration and the mobile part (MT, OA, HA) is therefore able in principle to logon at the base station (BS);

establishing a basic channel connection (NKV), which is suitable for voice data transmission, between the mobile part (MT, OA, HA) and the base station (BS) if the ability to logon in principle is detected, otherwise the mobile part (MT, OA, HA) detects whether it is able in principle to logon at a different logon-ready base station (BS);

examining an ACTUAL authentication code (IAK) which is spoken into the mobile part (MT, OA, HA) to determine whether the ACTUAL authentication code (IAK) is identical to a REFERENCE authentication code (SAK); and registering the mobile part (MT, OA, HA) at the base station (BS) if the ACTUAL authentication code (IAK) matches the REFERENCE authentication code (SAK), otherwise the registration attempt is rejected.

2. The method of claim 1, wherein following a rejected registration attempt, the registration is repeated at least once before the registration fails definitively.

3. The method of claim 1, wherein the detection procedure of the mobile part (MT, OA, HA), which procedure detects whether it is able to logon at another logon-ready base station (BS), is executed until no further logon-ready base station (BS) can be found by the mobile part (MT, OA, HA).

4. The method of claim 1, wherein a battery-operated cordless handset (HA) which has a keypad or a stylus-based input medium for character input is used as a mobile part (MT, OA, HA) and a cordless base station (BS) including an integrated battery charging device (ALE) is used as a base station (BS), and that the logon readiness of the cordless base station (BS) and of the cordless handset (HA) is established by inserting the cordless handset (HA) into the battery charging device (ALE).

5. The method of claim 1, wherein a cordless handset (HA) which has a keypad or a stylus-based input medium for character input and includes an operating element for starting a call (GST), in particular a start call key (GST), is used as a mobile part (MT, OA, HA) and a cordless base station (BS) including an operating element for establishing the logon readiness (AT), in particular a logon key (AT), is used as a base station (BS), and that the logon readiness of the cordless base station (BS) is established by activating the operating element for establishing the logon readiness (AT) and the logon readiness of the cordless handset (HA) is established by activating the operating element for starting a call (GST).

6. The method of claim 1, wherein a cordless earphone (OA) which includes an operating element for starting a call (GST), in particular a start call key (GST), is used as a mobile part (MT, OA, HA) and a cordless base station (BS) including an operating element for establishing the logon readiness (AT), in particular a logon key (AT), is used as a base station (BS), and that the logon readiness of the cordless base station (BS) is established by activating the operating element for establishing the logon readiness (AT) and the logon readiness of the cordless earphone (OA) is established by activating the operating element for starting a call (GST).

7. The method as claimed in claim 1, wherein the exchange of messages (MA) takes place via charging contacts (ALK) in a battery charging device (ALE) if the cordless mobile part (HA) is located in the battery charging device (ALE) of the cordless base station (BS).

8. The method as claimed in claim 1, wherein the exchange of messages (MA) takes place via air interfaces (LSS) in the base station (BS) and in the mobile part (MT, OA, HA).

9. The method of claim 1, wherein the exchange of messages (MA) includes a first message "ACCESS RIGHTS REQUEST" (M1) being transmitted from the mobile part (MT, OA, HA) to the base station (BS), by means of which the mobile part (MT, OA, HA) introduces itself to the base station (BS) and by means of which the mobile part (MT, OA, HA) requests access fights at the base station (BS), and of either a second message "ACCESS RIGHTS REJECT" (M2) being transmitted from the base station (BS) to the mobile part (MT, OA, HA), by means of which the base station (BS) refuses the access fights for the mobile part (MT, OA, HA) if the base station (BS) does not support the voice-controlled registration or if the mobile part (MT, OA, HA) is already logged on, or a third message "ACCESS RIGHTS CONFIRM" (M3) being transmitted from the base station (BS) to the mobile part (MT, OA, HA), by means of which the base station (BS) grants the request of the mobile part (MT, GA, HA) for access rights if the base station (BS) supports the voice-controlled registration.

10. The method of claim 1, wherein the basic channel connection (NKV) is established by the base station (BS).

11. The method of claim 1, wherein when the basic channel connection (NKV) is established, a welcome text "you want to logon your mobile part" and "please speak the PIN code" (BT) is sent from the base station (BS) to the mobile part (MT, OA, HA) via the basic channel connection (NKV) and is output by said mobile part (MT, OA, HA).

12. The method as claimed in claim 1, wherein a PIN code is used in each case as an ACTUAL authentication code (IAK), a recovered ACTUAL authentication code (IAK') and a REFERENCE authentication code (SAK).

13. The method of claim 1, wherein in order to examine whether the ACTUAL authentication code (IAK) is identical to the REFERENCE authentication code (SAK), a voice sample (SPM) corresponding to the spoken ACTUAL authentication code (IAK) is analyzed and a recovered ACTUAL authentication code (IAK') is generated from the voice sample (SPM) and is compared with the REFERENCE authentication code (SAK).

14. The method of claim 13, wherein, a code signal (KS) which is generated from the spoken ACTUAL authentication code (IAK) and contains the voice sample (SPM) is transmitted from the mobile part (MT, OA, HA) to the base station (BS) and the examination takes place in the base station (BS).

15. The method of claim 14, wherein the voice sample (SPM) which corresponds to the spoken ACTUAL authentication code (IAK) is analyzed in the mobile part (MT, OA, HA) and the recovered ACTUAL authentication code (IAK') is generated from the voice sample (SPM), and that the recovered ACTUAL authentication code (IAK') is transmitted in encrypted form (IAK") from the mobile part (MT, OA, HA) to the base station (BS), which decrypts the encrypted recovered ACTUAL authentication code (IAK') and then compares it with the REFERENCE authentication code (SAK).

16. The method of claim 1, wherein if the recovered ACTUAL authentication code (IAK') matches the REFERENCE authentication code (SAK) a fourth message "ACCESS RIGHTS ACCEPT" (M4) is transmitted from the base station (BS) to the mobile part (MT, OA, HA) whereby the mobile part (MT, OA, HA) receives the access rights from the base station (BS), or if the recovered ACTUAL authentication code (IAK') does not match the REFERENCE authentication code (SAK) the second message "ACCESS RIGHTS REJECT" (M2) is transmitted from the base station (BS) to the mobile part (MT, OA, HA) whereby the mobile part (MT, OA, HA) is refused the access rights by the base station (BS).

17. The method of claimed 1, wherein if the recovered ACTUAL authentication code (IAK') matches the REFERENCE authentication code (SAK), an information text "you are logged on" and "you have the internal subscriber number 'xyz'" (HT) is sent from the base station (BS) via the basic channel connection (NKV) to the mobile part (MT, OA, HA,) where it is output.

18. A telecommunication system including wireless telecommunication between a mobile part (MT, OA, HA) and a base station (BS) for registering the mobile part (MT, OA, HA) at the base station (BS), comprising:
  means for establishing a logon readiness (ABM, AT, ALE, ALK, GST) in the mobile part (MT, OA, HA) and in the base station (BS), which are developed in such a way that whenever they are activated the mobile part and the base station are switched into a logon-ready mode for reciprocal logon;
  a central control device (ZST) for controlling operating flows and functional flows in the mobile part and the base station;
  signal transmission means (SSM) and signal reception means (SEM) connected to the central control device (ZST); and
  signal analysis means (SAM) assigned to the central control device (ZST) in the mobile part (MT, OA, HA) and in the base station (BS) thereby forming a combined functional unit, which are developed such that an exchange of messages (MA) between the mobile part (MT, OA, HA) and the base station (BS) detects whether the base station (BS) supports a voice-controlled registration, the mobile part (MT, OA, HA) being able to logon at the base station (BS) if the ability to logon is detected, and a basic channel connection (NKV) suitable for the voice transmission is established between the mobile part (MT, OA, HA) and the base station (BS), otherwise the mobile part (MT, OA, HA) detects whether it is able to logon at a different logon-ready base station (BS);

a voice input device (SEV) and a signal generating device (SEE) connected in the mobile part (MT, OA, HA) are also connected to the central control device (ZST) in the mobile part (MT, OA, HA) and developed in such a way that a code signal (KS) is generated from an ACTUAL authentication code (IAK) which is spoken into the voice input device (SEV), said code signal (KS) containing a voice sample (SPM) which corresponds to the ACTUAL authentication code (IAK);

voice recognition means (SPEM) assigned to the central control device (ZST) in the mobile part (MT, OA, HA) or in the base station (BS) that analyzes the code signal (KS) that contains the voice sample (SPM), transmits it to said voice recognition means (SPEM), and generates a recovered ACTUAL authentication code (IAK') from the voice sample (SPM); and comparison means (VM) assigned to the central control device (ZST) in the base station (BS) that examines, with reference to the recovered ACTUAL authentication code (IAK') that is transmitted to said comparison means (VM), whether the recovered ACTUAL authentication code (IAK') is identical to a REFERENCE authentication code (SAK), wherein the central control device (ZST), the signal transmission means (SSM) and signal reception means (SEM) form a combined functional unit, which are developed in such a way that the mobile part (MT, OA, HA) is registered at the base station (BS) if the recovered ACTUAL authentication code (IAK') matches the REFERENCE authentication code (SAK), otherwise the registration attempt is rejected.

19. The telecommunication system of claim 17, wherein the central control device (ZST), the signal transmission means (SSM) and signal reception means (SEM), which are formed as a combined functional unit, are developed in such a way that following a rejected registration attempt the registration is repeated at least once before the registration fails definitively.

20. The telecommunication system of claim 18, wherein the central control device (ZST), the signal transmission means (SSM) and signal reception means (SEM) which are connected to the central control device (ZST) and the signal analysis means (SAM) which are assigned to the central control device (ZST) in the mobile part (MT, OA, HA) for determining whether the mobile part (MT, OA, HA) is able to logon to another logon-ready base station (BS) are developed in such a way that a combined functional unit is formed with the central control device (ZST), the signal transmission means (SSM) and signal reception means (SEM) which are connected to the central control device (ZST), and the signal analysis means (SAM) which are assigned to the central control device (ZST) in the other base station (BS) until such time as no other logon-ready base station (BS) can be found by the mobile part (MT, OA, HA).

21. The telecommunication system of claim 18, wherein the mobile part (MT, OA, HA) is a battery-operated cordless handset (HA) including a keypad or stylus-based input medium for character input and the base station (BS) is a cordless base station (BS) including a battery charging device (ALE), wherein the means for establishing the logon readiness (ABM, AT, ALE, ALK, GST) in the cordless base station (BS) and in the cordless handset (HA) are developed in such a way that the logon readiness can be established by inserting the cordless handset (HA) into the battery charging device (ALE).

22. The telecommunication system as claimed in claim 18, wherein the mobile part (MT, OA, HA) is a cordless handset (HA) which has a keypad or a stylus-based input medium for character input and includes an operating element for starting a call (GST), in particular a start call key (GST), and the base station (BS) is a cordless base station (BS) including an operating element for establishing the logon readiness (AT), wherein the means for establishing the logon readiness (ABM, AT, ALE, ALK, GST) in the cordless base station (BS) are developed in such a way that the logon readiness of the cordless base station (BS) can be established by activating the operating element for establishing the logon readiness (AT) and wherein the means for establishing the logon readiness (ABM, AT, ALE, ALK, GST) in the cordless handset (HA) are developed in such a way that the logon readiness of the cordless handset (HA) can be established by activating the operating element for starting a call (GST).

23. The telecommunication system as claimed in claim 18, wherein the mobile part (MT, OA, HA) is a cordless earphone (OA) including an operating element for starting a call (GST), in particular a start call key (GST), and the base station (BS) is a cordless base station (BS) including an operating element for establishing the logon readiness (AT), wherein the means for establishing the logon readiness (ABM, AT, ALE, ALK, GST) in the cordless base station (BS) are developed in such a way that the logon readiness of the cordless base station (BS) can be established by activating the operating element for establishing the logon readiness (AT) and wherein the means for establishing the logon readiness (ABM, AT, ALE, ALK, GST) in the cordless earphone (OA) are developed in such a way that the logon readiness of the cordless earphone (OA) can be established by activating the operating element for starting a call (GST).

24. The telecommunication system of claim 23, wherein the central control device (ZST), the signal transmission means (SSM) and signal reception means (SEM) which are connected to the central control device (ZST) and the signal analysis means (SAM) which are assigned to the central control device (ZST) in the cordless handset (HA) and in the cordless base station (BS) forming a combined functional unit, are developed in such a way that the exchange of messages (MA) takes place via charging contacts (ALK) in the battery charging device (ALE) if the cordless handset (HA) is located in the battery charging device (ALE) of the cordless base station (BS).

25. The telecommunication system of claim 18, wherein the central control device (ZST), the signal transmission means (SSM) and signal reception means (SEM) which are connected to the central control device (ZST) and the signal analysis means (SAM) which are assigned to the central control device (ZST) in the mobile part (MT, OA, HA) and in the base station (BS), forming a combined functional unit, are developed in such a way that the exchange of messages (MA) takes place via air interfaces (LSS) in the base station (BS) and in the mobile part (MT, OA, HA).

26. The telecommunication system of claim 25, wherein the central control device (ZST), the signal transmission means (SSM) and signal reception means (SEM) which are connected to the central control device (ZST) and the signal analysis means (SAM) which are assigned to the central control device (ZST) in the mobile part (MT, OA, HA) and in the base station (BS), forming a combined functional unit, are developed in such a way that the exchange of messages (MA) consists of a first message "ACCESS RIGHTS REQUEST" (M1) being transmitted from the mobile part (MT, OA, HA) to the base station (BS), by means of which the mobile part (MT, OA, HA) introduces itself to the base station (BS) and by means of which the mobile part (MT, OA, HA) requests access fights at the base station (BS), and of either a second message "ACCESS RIGHTS REJECT" (M2) being transmitted from the base station (BS) to the mobile part (MT, OA, HA), by means of which the base station (BS) refuses the access fights for the mobile part (MT, OA, HA) if the base station (BS) does not support the voice-controlled registration or if the mobile part (MT, OA, HA) is already logged on, or a third message "ACCESS RIGHTS CONFIRM" (M3) being transmitted from the base station (BS) to the mobile part (MT, OA, HA), by means of which the base station (BS) grants the request of the mobile part (MT, OA, HA) for access rights if the base station (BS) supports the voice-controlled registration.

27. The telecommunication system of claim 18, wherein the central control device (ZST) and the signal transmission means (SSM) and signal reception means (SEM) which are connected to the central control device (ZST) in the base station (BS) are developed in such a way that the basic channel connection (NKV) is established by the base station (BS).

28. The telecommunication system of claim 27, wherein text generating means (TEM) which are assigned to the central control device (ZST) in the base station (BS), the central control device (ZST) and the signal transmission means (SSM) which are connected to the central control device (ZST) in the base station (BS), and a text output device (TAV) which is assigned to the central control device (ZST) in the mobile part (MT, OA, HA), the central control device (ZST) and the signal reception means (SEM) which are connected to the central control device (ZST) in the mobile part (MT, OA, HA), forming a combined functional unit, are developed in such a way that when the basic channel connection (NKV) is established, a welcome text "You want to logon your mobile part. Please speak the PIN code." (BT) is sent from the base station (BS) to the mobile part (MT, OA, HA) via the basic channel connection (NKV) and is output by said mobile part (MT, OA, HA) using the text output device (TAV).

29. The telecommunication system of claim 18, wherein the ACTUAL authentication code (IAK), the recovered ACTUAL authentication code (IAK') and the REFERENCE authentication code (SAK) are PIN codes.

30. The telecommunication system of claim 18, wherein the voice recognition means (SPEM) which are arranged in the base station (BS), the comparison means (VM) which are connected to the voice recognition means (SPEM), the central control device (ZST) and the signal reception means (SEM) in the base station (BS), and the voice input device (SEV), the signal generating device (SEE), the central control device (ZST) and the signal transmission means (SSM) in the mobile part (MT, OA, HA), forming a combined functional unit, are developed in such a way that a code signal (KS) is transmitted from the signal generating device (SEE) in the mobile part (MT, OA, HA) to the signal reception means (SEM) in the base station (BS).

31. The telecommunication system of claim 18, wherein the voice recognition means (SPEM) which are arranged in the mobile part (MT, OA, HA), the voice input device (SEV), the signal generating device (SEE), the central control device (ZST), encryption means (VSM) which are assigned to the central control device (ZST) and the signal transmission means (SSM) in the mobile part (MT, OA, HA), and the central control device (ZST), the signal reception means (SEM), the comparison means (VM) and decryption means (ESM) which are assigned to the central control device (ZST) in the base station (BS), forming a combined functional unit, are developed in such a way that the recovered ACTUAL authentication code (IAK') is transmitted in encrypted form (IAK") from the encryption means (VSM) in the mobile part (MT, OA, HA) to the decryption means (ESM) in the base station (BS), which then forward the encrypted recovered ACTUAL authentication code (IAK') to the comparison means (VM) in decrypted form.

32. The telecommunication system of claim 18, wherein the central control device (ZST), the signal transmission means (SSM) and signal reception means (SEM) which are connected to the central control device (ZST) and the signal analysis means (SAM) which are assigned to the central control device (ZST) in the mobile part (MT, OA, HA) and in the base station (BS) as well as the comparison means (VM), forming a combined functional unit, are developed in such a way that if the recovered ACTUAL authentication code (IAK') matches the REFERENCE authentication code (SAK) a fourth message "ACCESS RIGHTS ACCEPT" (M4) is transmitted from the base station (BS) to the mobile part (MT, OA, HA) whereby the mobile part (MT, OA, HA) receives the access rights from the base station (BS).

33. The telecommunication system of claim 32, wherein text generating means (TEM) which are assigned to the central control device (ZST) in the base station (BS), the central control device (ZST), the comparison means (VM) and the signal transmission means (SSM) which are connected to the central control device (ZST) in the base station (BS), and the text output device (TAV) which is assigned to the central control device (ZST) in the mobile part (MT, OA, HA), the central control device (ZST) and the signal reception means (SEM) which are connected to the central control device (ZST) in the mobile part (MT, OA, HA), forming a combined functional unit, are developed in such a way that if the recovered ACTUAL authentication code (IAK') matches the REFERENCE authentication code (SAK), an information text "you are logged on" and "you have the internal subscriber number 'xyz'" (HT) is sent from the base station (BS) via the basic channel connection (NKV) to the mobile part (MT, OA, HA,) where it is output using the text output device (TAV).

* * * * *